US011860578B2

(12) United States Patent
Bachmann

(10) Patent No.: US 11,860,578 B2
(45) Date of Patent: Jan. 2, 2024

(54) INDICATOR ANTI-CORRECTION SYSTEM FOR A TIMEPIECE

(71) Applicant: ETA SA Manufacture Horlogère Suisse, Grenchen (CH)

(72) Inventor: Stéphane Bachmann, Bueren an der Aare (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 331 days.

(21) Appl. No.: 17/234,917

(22) Filed: Apr. 20, 2021

(65) Prior Publication Data

US 2021/0389727 A1 Dec. 16, 2021

(30) Foreign Application Priority Data

Jun. 12, 2020 (EP) .................................... 20179603

(51) Int. Cl.
*G04B 19/253* (2006.01)

(52) U.S. Cl.
CPC ................................ *G04B 19/2532* (2013.01)

(58) Field of Classification Search
CPC .......... G04B 19/2532; G04B 19/25333; G04B 19/25326
See application file for complete search history.

(56) References Cited

U.S. PATENT DOCUMENTS

| | | | |
|---|---|---|---|
| 4,240,249 | A | 12/1980 | Malkin et al. |
| 2003/0151981 | A1 | 8/2003 | Vernay et al. |
| 2014/0056112 | A1 | 2/2014 | Villaret |

(Continued)

FOREIGN PATENT DOCUMENTS

| | | | |
|---|---|---|---|
| CN | 103698995 | A | 4/2014 |
| CN | 105093900 | A | 11/2015 |

(Continued)

OTHER PUBLICATIONS

European Search Report dated Dec. 18, 2020 in European Application 20179603.4 filed on Jun. 12, 2020, 3 pages (with English Translation of Categories of Cited Documents).

(Continued)

*Primary Examiner* — Renee S Luebke
(74) *Attorney, Agent, or Firm* — Oblon, McClelland, Maier & Neustadt, L.L.P.

(57) ABSTRACT

An indicator anti-correction system for a timepiece, the system including a correction mechanism of the indicator and a correction gear configured to mesh with the indicator, the correction mechanism being configured to be connected to a manual correction actuation system and to mesh with the correction gear in a first correction position, the correction mechanism being movably mounted between the first correction position and a second non-correction position, wherein the system further includes a component mounted movable in rotation about an axis, the component having a first end configured to cooperate with at least one protuberance provided on the date indicator or the hour wheel, the component having a second end configured to cooperate with the correction mechanism so as to block the mechanism in an anti-correction position when the first end of the component cooperates with the at least one protuberance.

16 Claims, 2 Drawing Sheets

(56) References Cited

U.S. PATENT DOCUMENTS

| | | | | |
|---|---|---|---|---|
| 2017/0075304 | A1* | 3/2017 | Philippon | G04B 3/003 |
| 2017/0075307 | A1 | 3/2017 | Merino et al. | |

FOREIGN PATENT DOCUMENTS

| | | | |
|---|---|---|---|
| CN | 106104394 | A | 11/2016 |
| CN | 106527094 | A | 3/2017 |
| EP | 1 335 253 | A1 | 8/2003 |
| EP | 2 701 014 | A1 | 2/2014 |
| JP | 63-313089 | A | 12/1988 |
| WO | WO 2015/172943 | A2 | 11/2015 |

OTHER PUBLICATIONS

Combined Chinese Office Action and Search Report dated Jun. 22, 2022 in Chinese Patent Application No. 202110651142.4 (with unedited computer generated English Translation of Office Action only), 7 pages.

* cited by examiner

INDICATOR ANTI-CORRECTION SYSTEM FOR A TIMEPIECE

CROSS-REFERENCE TO RELATED APPLICATION

This application claims priority to European Patent Application No. 20179603.4 filed on Jun. 12, 2020, the entire disclosure of which is hereby incorporated herein by reference.

TECHNICAL FIELD

The invention relates to an indicator anti-correction system for a timepiece. Without this being limiting, a particular field of application of the present invention is that of horological complications of the annual calendar mechanism type. The indicator is, for example, a date indicator, a month indicator or else a day or year indicator or a week indicator.

The invention also relates to a timepiece including such an anti-correction system. The timepiece is, for example, a mechanical watch.

TECHNOLOGICAL BACKGROUND

An annual calendar mechanism is a horological complication which takes into account the fact that the twelve months of the year do not all have the same number of days. The annual calendar mechanism is therefore capable of correctly displaying the date of the first day of the months following a thirty-day month. However, such a mechanism does not take into account either the month of February (considered as a thirty or thirty-one-day month) or leap years. The difference in duration between the months is typically taken into account thanks to a cam having solid portions and notches.

However, in order to ensure the proper functioning of the annual calendar mechanism, the correction of the month on the thirtieth day of each month must be mechanically blocked within the system. Indeed, otherwise, there is a risk of temporary desynchronisation. Such a mechanical blocking is for example achieved by means of a lug provided on an upper portion of the date indicator. The position of the lug on the date indicator is chosen such that the lug blocks a drive gear in rotation on the thirtieth day of each month, the drive gear being integral with a correction gear configured to mesh with the month indicator under the action of a correction mechanism. The correction mechanism is indeed configured to mesh with the correction gear in a correction position, and is movably mounted between this correction position and a non-correction position.

However, a problem posed by this type of mechanical blocking is that if the user decides to manually correct the month (for example by means of a manual correction system of the actuating rod type) when the lug blocks the rotation of the drive gear, there is a very significant risk that the user will force the system, thus leading to degradation or even breakage of certain components such as the correction gear for example. In order to address this problem, a known solution consists in providing, in the correction mechanism of the month indicator, a part held by friction and capable of rotating about an axis, of the friction board type. In this way, if the user tries to correct the month manually while the drive train is blocked in rotation by the lug provided on the date indicator, the effect of friction causes the board of the correction mechanism to rotate on its axis, without any other effect on the correction gear. This helps prevent any component damage, while preventing manual correction. However, a disadvantage of this solution is that it is not optimal in its implementation and control. Indeed, the quality and precision of the friction fluctuates easily with the machining tolerances of the part, during its mounting, its lubrication (amount or type of lubrication) or else during its service life (phenomena of lapping or wear).

SUMMARY OF THE INVENTION

The purpose of the invention is therefore to provide an indicator anti-correction system for a timepiece, allowing to simply prevent any deterioration of a component in the event of an attempt of manual correction on a day or an hour during which the correction is prohibited, without having to use a part held by friction.

To this end, the invention relates to an indicator anti-correction system for a timepiece, and which comprises the features mentioned in independent claim 1.

Particular forms of the anti-correction system are defined in dependent claims 2 to 13.

According to the invention, the system comprises a component mounted movable in rotation about an axis. The component has a first end configured to cooperate with at least one protuberance provided on the date indicator or the hour wheel, and a second end configured to cooperate with the correction mechanism so as to block the mechanism in an anti-correction position when the first end of the component cooperates with said at least one protuberance. By this movement, the component thus rotates about its axis and blocks the mechanism in the anti-correction position. The correction mechanism is then stopped before the end of its travel for the correction of the date or the month, and rotates freely. On the other (non-prohibited) days of the month, or the other (non-prohibited) hours of the day, the component is free and allows the correction mechanism to freely switch also from its non-correction position to its correction position wherein it meshes with the correction gear. Such a solution according to the invention is particularly simple and allows to control the performance and the stability of the anti-correction system, compared to the solutions of the prior art using parts held by friction. Furthermore, the system according to the invention allows to prevent any deterioration of a component in the event of an attempt of manual correction on a day or an hour during which the correction is prohibited, while ensuring good behaviour of the date mechanism and avoiding any risk of temporary desynchronisation.

According to a preferred embodiment, the component is mounted free in rotation about the axis. This variant allows to reduce the consumption of mechanical torque within the system. It further allows to reduce mechanical wear between the system components and therefore increases the longevity of the system.

Advantageously, the system further comprises at least one stopper configured to limit the angular displacement of the correction mechanism between its correction and non-correction positions.

Advantageously, the correction mechanism is configured so that its second non-correction position of the indicator corresponds to a correction position of the date indicator or of the hour wheel.

Advantageously, the correction mechanism is configured so that its anti-correction position corresponds to its second non-correction position of the indicator.

According to a particular technical feature of the invention, the or each protuberance is provided on a lower portion of the date indicator or of the hour wheel, and extends in a plane defined by the lower portion of said date indicator or of said hour wheel.

According to a first embodiment of the invention, the system is a month indicator anti-correction system, and the date indicator is provided with at least one protuberance, the position of the or each protuberance on the date indicator corresponding to a predetermined date for which the protuberance cooperates with the first end of the component so as to cause the mechanism to be blocked in its anti-correction position.

According to a second embodiment of the invention, the system is a date indicator anti-correction system, and the hour wheel is provided with at least one protuberance, the position of the or each protuberance on the hour wheel corresponding to a predetermined time during which the protuberance cooperates with the first end of the component so as to cause the mechanism to be blocked in its anti-correction position.

To this end, the invention also relates to a horological movement comprising the anti-correction system described above, and which comprises the features mentioned in dependent claim 14.

To this end, the invention also relates to a timepiece including the horological movement described above and/or the anti-correction system described above, and which comprises the features mentioned in dependent claim 15.

A particular form of the timepiece is defined in dependent claim 16.

BRIEF DESCRIPTION OF THE FIGURES

The purposes, advantages and features of the anti-correction system of a date or month indicator according to the invention will appear better in the following description on the basis of at least one non-limiting embodiment illustrated by the drawings wherein.

DETAILED DESCRIPTION OF THE INVENTION

In the following description, reference is made to a horological movement provided with a date mechanism, typically an annual calendar mechanism. The usual components of the horological movement, which are well known to a person skilled in the art in this technical field, are only described in a simplified manner or not described at all. The person skilled in the art will indeed be able to adapt these various components and make them cooperate for the operation of the horological movement. In particular, everything relating to the date mechanism will not be described below.

Figure 1:
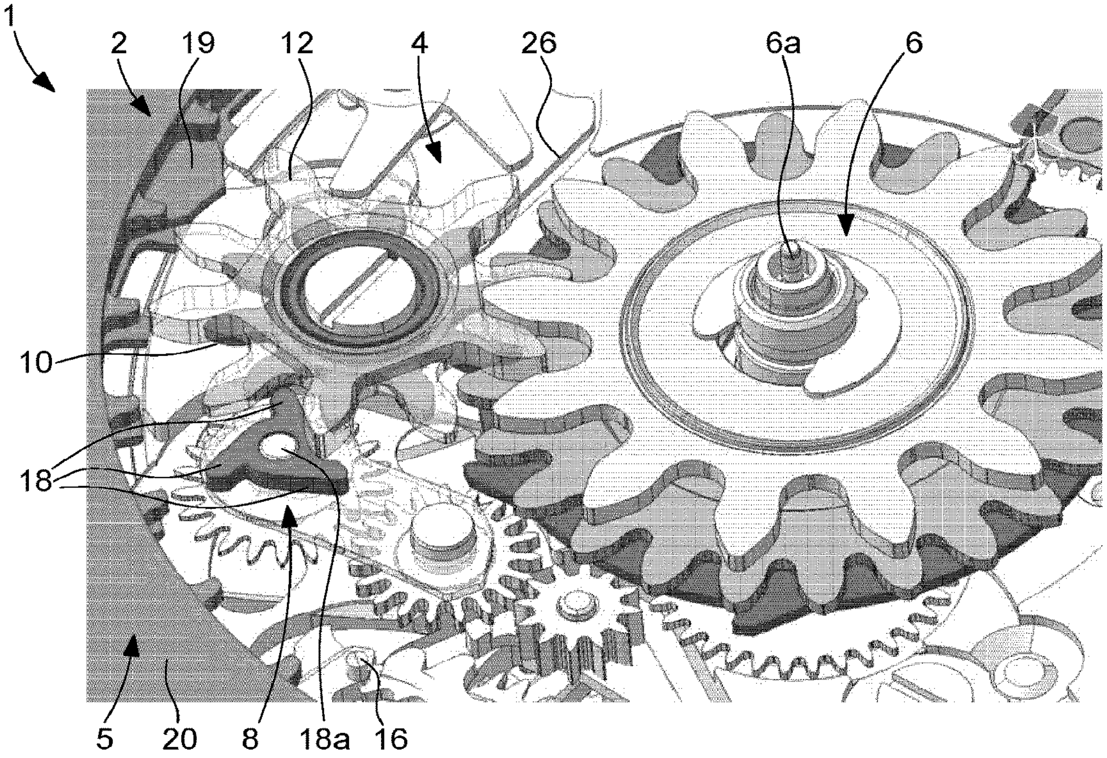
FIG. 1 is a perspective view of a portion of a horological movement of a watch comprising a month indicator anti-correction system according to a particular embodiment of the invention.

FIGS. 1 to 4 show a portion of a timepiece 1, which comprises a horological movement 2. The timepiece 1 is typically a mechanical watch. The horological movement 2 includes an indicator 6 anti-correction system 4. The indicator 6 is for example a date indicator, a month indicator or else a day or year indicator or a week indicator, without this being limiting in the context of the present invention. In the particular embodiment shown in FIGS. 1 to 4, the system 4 is a month indicator 6 anti-correction system. In this case, the horological movement 2 also includes a date indicator 5 and an annual calendar mechanism (the latter not being shown in the figures). The month indicator 6 is shown in FIG. 1. In this figure (wherein the upper washer provided with the month digits has been omitted), the month indicator 6 is rotatably mounted about an axis 6*a*. During thirty-day months, the month indicator 6 is driven by another system (not shown) belonging to the annual calendar mechanism, in order to modify the value of the month at the end of the thirtieth day. In a variant not shown, the system 4 is a date indicator anti-correction system.

The system 4 comprises a correction mechanism 8 of the month indicator 6, a correction gear 10, a drive gear 12, and a movable component 14 (not shown in FIG. 1 for clarity). Preferably, the system 4 also comprises at least one stopper (not visible in the figures). According to a particular variant embodiment not shown in the figures, the system 4 also comprises a spring mounted so as to urge the movable component 14 towards an elastic return position.

The correction mechanism 8 is connected to a manual correction actuation system (not shown in the figures), such as for example an actuating rod connected to a winding crown. The correction mechanism 8 is movably mounted between a first correction position illustrated in FIGS. 1 and 2, wherein the correction mechanism 8 meshes with the correction gear 10; and a second non-correction position (not shown in the figures) wherein the mechanism 8 does not mesh with the correction gear 10. Preferably, the correction mechanism 8 is configured so that its second non-correction position of the month indicator 6 corresponds to a correction position of the date indicator 5. More preferably, the correction mechanism 8 comprises at least one drive finger 18. In the particular exemplary embodiment illustrated in FIGS. 1 to 4, the correction mechanism 8 comprises three drive fingers 18 regularly distributed over 360 degrees around an axis 18*a* which is mounted on the mechanism 8. The drive fingers 18 are integral and rotatably mounted about the axis 18*a*. The drive fingers 18 are configured to mesh with the correction gear 10 in the first correction position of the mechanism 8.

The correction gear 10 is integral with the drive gear 12. As illustrated in FIG. 1, the correction gear 10 is configured to mesh with the month indicator 6.

The drive gear 12 is mounted on the correction gear 10, and is for example configured to cooperate with at least one lug 19 provided on an upper portion 20 of the date indicator 5. In the particular exemplary embodiment illustrated in FIG. 1, the upper portion 20 of the date indicator 5 is provided with a single lug 19. The lug 19 drives the month indicator 6, via the drive train 12, during a long month (a thirty-one-day month). Conversely, the lug 19 is driven by the month indicator 6, via the drive gear 12, for a short month (less than thirty-one days). Preferably, as illustrated in FIG. 1, the lug 19 extends in the plane defined by the upper portion 20 of the date indicator 5, and extends radially inwardly of the date indicator 5.

Alternatively, the upper portion 20 of the date indicator 5 is not provided with any lug. This is for example the case when the horological movement 2 is provided with a simple non-annual date mechanism.

Figure 2:
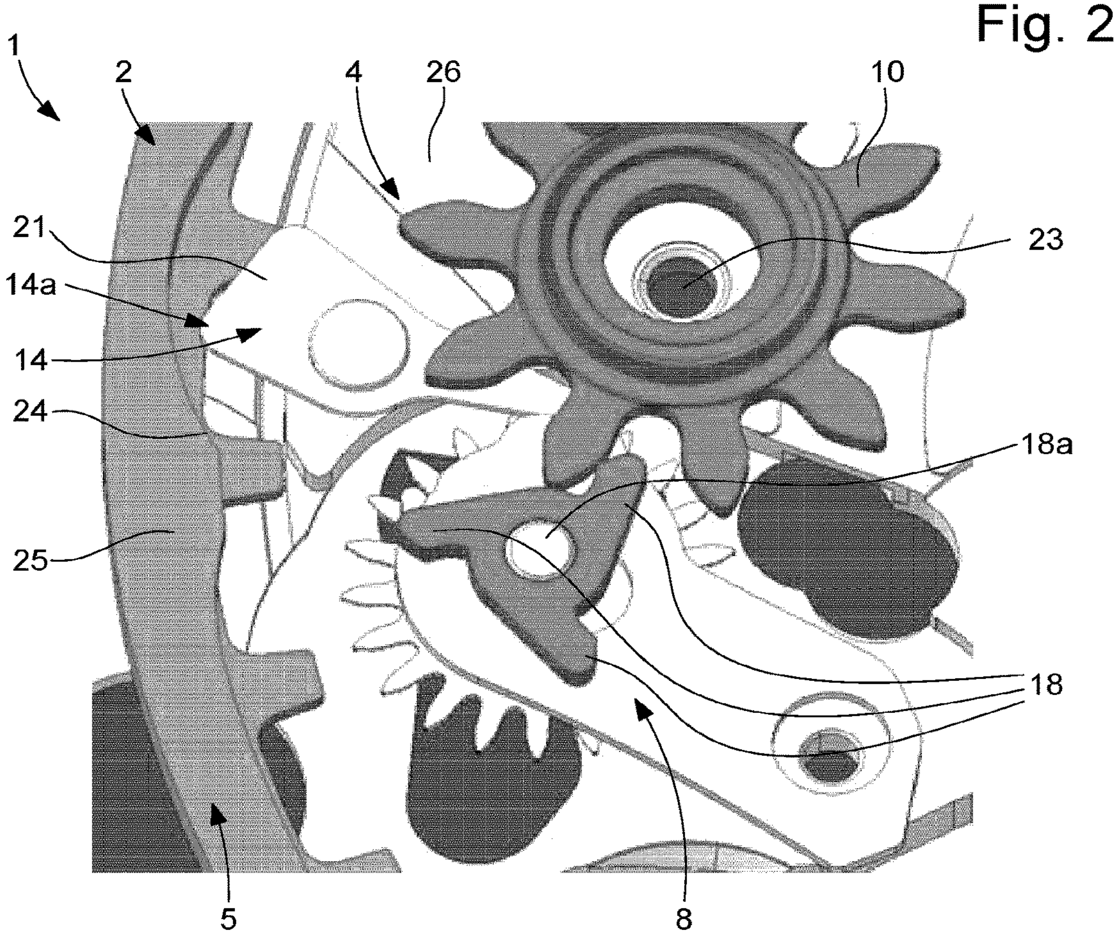
FIG. 2 is a perspective view of the anti-correction system of FIG. 1, the anti-correction system comprising a component movable in rotation about an axis, the component being shown in an authorised correction position.
Figure 3:
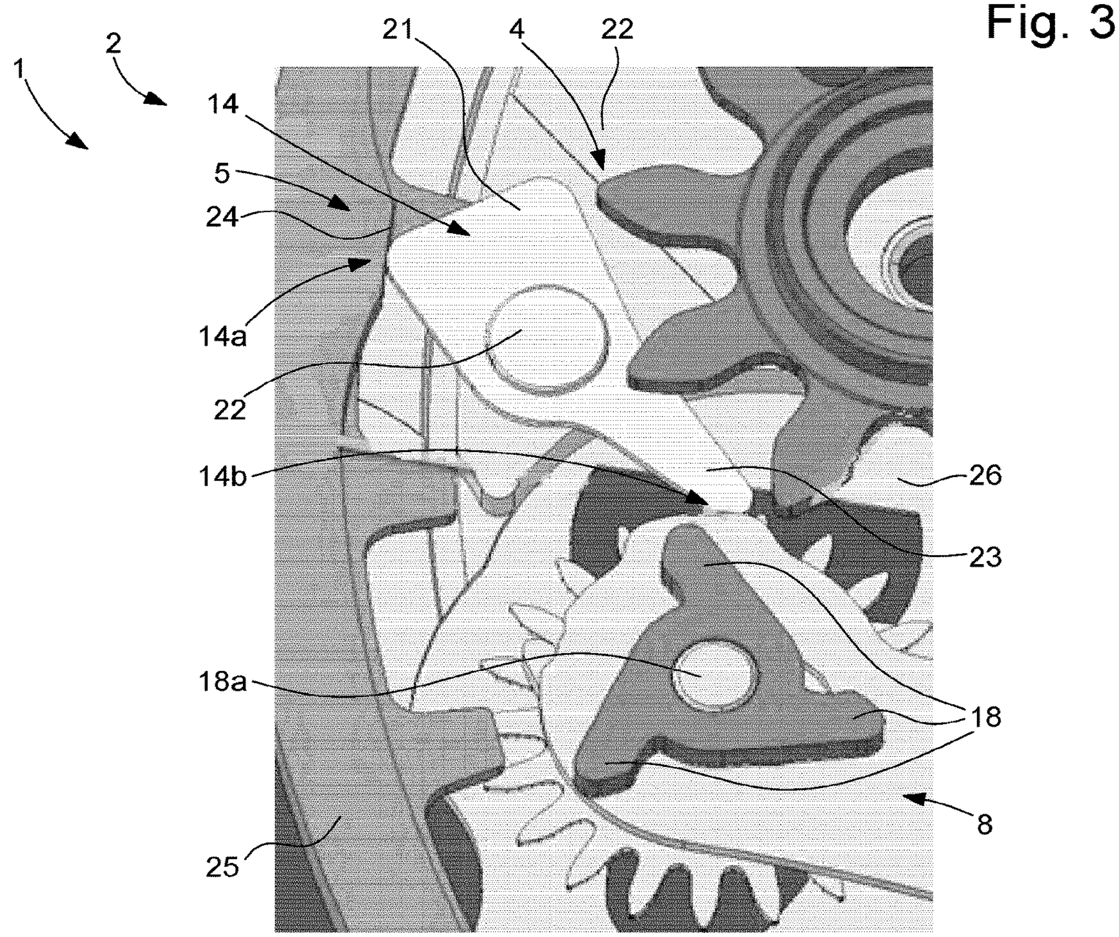
FIG. 3 is a view similar to that of FIG. 2, the movable component being shown in a prohibited correction position.
Figure 4:
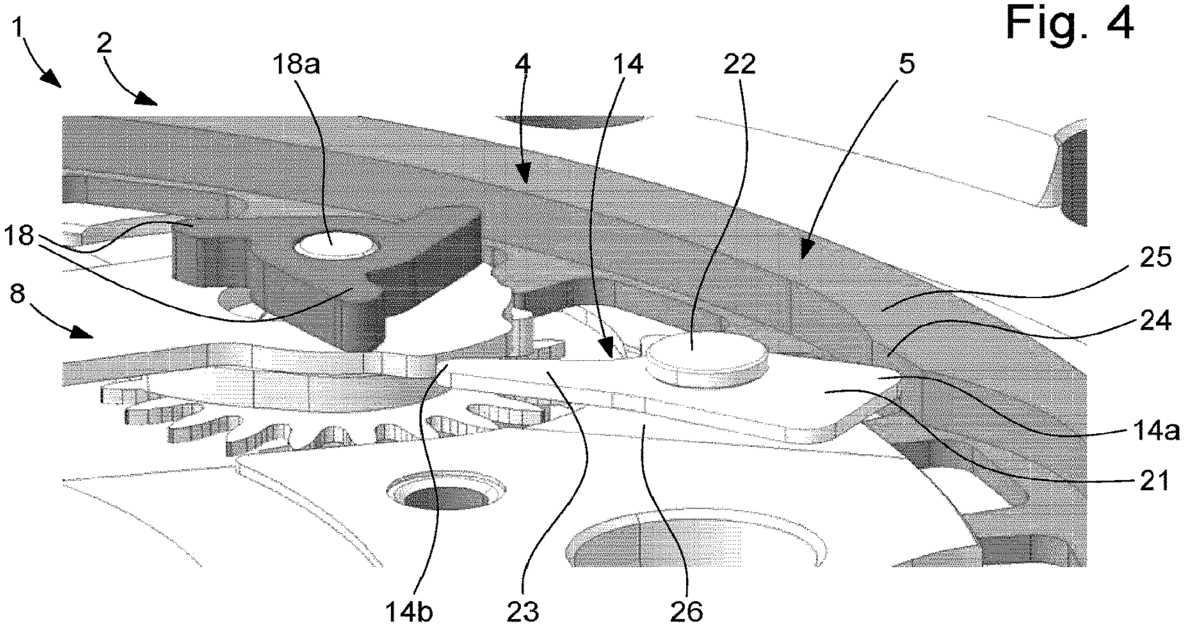
FIG. 4 is a view similar to that of FIG. 3, taken from a different perspective.

The component 14, which is visible in FIGS. 2 to 4, is mounted movable in rotation about an axis 22. In the preferred embodiment shown in FIGS. 1 to 4, the component 14 is mounted free in rotation about the axis 22. The component 14 is maintained in height on the axis 22, typically by means of a tenon or a pin. The component 14 has a first end 14*a* and a second end 14*b*. In the preferred exemplary embodiment illustrated in FIGS. 2 to 4, the component 14 is in the shape of a lever. In this case, the first end 14*a* corresponds to a corner of a first enlarged portion 21 of the lever, and the second end 14*b* corresponds to a free end of a second arm-shaped portion 23 of the lever. The first end 14*a* is configured to cooperate with at least one protuberance 24 provided on a lower portion 25 of the date indicator 5. In the particular exemplary embodiment illustrated in FIGS. 2 to 4, the lower portion 25 of the date indicator 5 is provided with a single protuberance 24. Preferably, as illustrated in FIGS. 2 to 4, the protuberance 24 extends in the plane defined by the lower portion 25 of the date indicator 5, and extends radially towards the inside of the date indicator 5. In a variant not shown, the lower portion 25 of the date indicator 5 is provided with at least two protuberances distributed at intervals which are regular or not on the periphery of the date indicator 5. The component 14 is for example made of a plastic material or of a metallic material, in particular steel. The component 14 is advantageously manufactured via a stamp, or else via plastic or metal injection, or else in the shape of bands or neckline.

As illustrated in FIGS. 3 and 4, the second end 14*b* of the component 14 is configured to cooperate with the correction mechanism 8 so as to block the mechanism 8 in an anti-correction position when the first end 14*a* of the component 14 cooperates with the protuberance 24. By this movement, the component 14 then rotates about its axis 22 and blocks the mechanism 8 in the anti-correction position. The correction mechanism 8 is then stopped before the end of its travel for the correction of the month, and rotates freely. The anti-correction position of the mechanism 8, visible in FIGS. 3 and 4, is a prohibited correction position of the month indicator 6. In the particular embodiment shown in FIGS. 1 to 4, the anti-correction position of the mechanism 8 is an intermediate position between the first correction position and the second non-correction position of the indicator 6. In a variant not shown, the correction mechanism 8 is configured so that its anti-correction position corresponds to its second non-correction position of the month indicator 6. The protuberance 24 is for example positioned so that the anti-correction position of the mechanism 8 is activated on the thirtieth day of each month. When the first end 14*a* of the component 14 does not cooperate with the protuberance 24, the movable component 14 is in an authorised correction position which is shown in FIG. 2. In this position of the movable component 14, the correction mechanism 8 is free to switch from its non-correction position to its correction position, and vice versa. This situation arises, for example, on a day other than the thirtieth day of the month.

The month indicator 6, the correction mechanism 8, the correction gear 10, the movable component 14 and the stopper are for example mounted on a plate 26 of the timepiece 1.

At least one of the stoppers is configured to limit the angular displacement of the correction mechanism 8 between its first correction position and its second non-correction position. At least one other stopper can be configured to limit the angular displacement of the movable component 14.

The present invention has been described with reference to a particular embodiment according to which the system 4 is an anti-correction system of a month indicator 6, and wherein the lower portion 25 of the date indicator 5 is provided with a single protuberance 24. According to another embodiment, not shown in the figures, the lower portion 25 of the date indicator 5 is provided with at least two protuberances. The position of each protuberance on the date indicator 5 then corresponds to a predetermined date for which the protuberance cooperates with the first end 14*a* of the component 14 so as to cause the blocking of the mechanism 8 in its anti-correction position. According to this particular embodiment, the manual correction of the month is prohibited on at least two predetermined days of each month. According to yet another embodiment, not shown in the figures, the system 4 is a date indicator anti-correction system. A lower portion of the hour wheel has at least one protuberance, preferably at least two protuberances. The position of each protuberance on the hour wheel then corresponds to a predetermined time during which the protuberance cooperates with the first end 14*a* of the component 14 so as to cause the blocking of the mechanism 8 in its anti-correction position. According to this particular embodiment, the manual correction of the date is prohibited during at least one predetermined time of each day, preferably during at least two predetermined times of each day.

The invention claimed is:

1. An indicator anti-correction system for a timepiece, the system comprising:

an indicator; a correction mechanism for the indicator;

a correction gear configured to mesh with said indicator, the correction mechanism being configured to be connected to a manual correction actuation system and to mesh with the correction gear in a first correction position, the correction mechanism being movably mounted between the first correction position and a second non-correction position; and a component mounted movable in rotation about an axis, said component having a first end configured to cooperate with at least one protuberance provided on a date indicator or an hour wheel, said component having a second end configured to cooperate with the correction mechanism so as to block the mechanism in an anti-correction position when the first end of the component cooperates with said at least one protuberance.

2. The anti-correction system according to claim 1, wherein the component is mounted free in rotation about the axis.

3. The anti-correction system according to claim 1, further comprising a spring mounted so as to urge the component towards an elastic return position.

4. The anti-correction system according to claim 1, wherein the component is mounted on a plate of the timepiece.

5. The anti-correction system according to claim 1, further comprising at least one stopper configured to limit an angular displacement of the correction mechanism between its first correction position and its second non-correction position.

6. The anti-correction system according to claim 1, wherein the component is in a shape of a lever, said lever having a first enlarged portion a corner of which forms the first end of the component, and a second arm-shaped portion, the free end of said arm forming the second end of the component.

7. The anti-correction system according to claim 1, wherein the component is made of a plastic material or of a metallic material.

8. The anti-correction system according to claim 1, wherein the correction mechanism is configured so that its second non-correction position of the indicator corresponds to a correction position of the date indicator or of the hour wheel.

9. The anti-correction system according to claim 1, wherein the correction mechanism is configured so that an anti-correction position corresponds to its a second non-correction position of the indicator.

10. The anti-correction system according to claim 1, wherein the correction mechanism comprises at least one drive finger, said at least one drive finger being rotatably mounted about an axis in turn mounted on the correction mechanism, and being configured to mesh with the correction gear in the first correction position of the correction mechanism.

11. The anti-correction system according to claim 1, wherein the or each protuberance is provided on a lower portion of the date indicator or of the hour wheel, and extends in a plane defined by the lower portion of said date indicator or of said hour wheel.

12. The anti-correction system according to claim 1, wherein the system is a month indicator anti-correction system, and wherein the date indicator is provided with at least one protuberance, a position of the at least one protuberance on the date indicator corresponding to a predetermined date for which the protuberance cooperates with the first end of the component so as to cause the mechanism to be blocked in its anti-correction position.

13. The anti-correction system according to claim 1, wherein the system is a date indicator anti-correction system, and wherein the hour wheel is provided with at least one protuberance, the position of the or each protuberance on the hour wheel corresponding to a predetermined time during which the protuberance cooperates with the first end of the component so as to cause the mechanism to be blocked in its anti-correction position.

14. A horological movement comprising an indicator anti-correction system, wherein the anti-correction system is in accordance with claim 1.

15. A timepiece comprising a horological movement and/or an indicator anti-correction system, wherein the horological movement is in accordance with claim 14.

16. The timepiece according to claim 15, wherein the timepiece is a mechanical watch.

* * * * *